United States Patent
Itoh

[11] Patent Number: 5,139,310
[45] Date of Patent: Aug. 18, 1992

[54] HEADREST
[75] Inventor: Yoshikazu Itoh, Akishima, Japan
[73] Assignee: Tachi-S Co., Ltd., Akishima, Japan
[21] Appl. No.: 686,161
[22] Filed: Apr. 16, 1991
[51] Int. Cl.$^5$ ............................................. B60R 21/055
[52] U.S. Cl. .................................. 297/391; 297/220; 297/183
[58] Field of Search ............... 297/391, 220, 217, 219, 297/221, 222

[56] References Cited

U.S. PATENT DOCUMENTS

| | | | |
|---|---|---|---|
| 849,592 | 4/1907 | Buchanan | 297/222 |
| 1,217,652 | 2/1917 | Spahr | 297/222 |
| 2,536,592 | 1/1951 | Caesar et al. | 297/221 |
| 3,449,011 | 6/1969 | Edwards et al. | 297/391 |
| 3,650,561 | 3/1972 | Faust et al. | 297/220 |
| 3,744,843 | 7/1973 | Barecki et al. | 297/391 |
| 4,619,725 | 10/1986 | Muraishi et al. | 297/391 |
| 4,639,041 | 1/1987 | Furukawa | 297/391 |

Primary Examiner—Kenneth J. Dorner
Assistant Examiner—Cassandra Hope
Attorney, Agent, or Firm—Oldham & Oldham Company

[57] ABSTRACT

A headrest with a decorative board attached to its rear side. The decorative board is formed with a gripping hook member in its inner wall, and on the other hand, the body of headrest is at its rear surface formed with a cut-away area through which is exposed a part of securing rod embedded in the headrest body. The gripping hook member is snap fitted over such exposed part of securing rod in the headrest body, whereby the decorative board is firmly attached to the rear side of the headrest at a given position precisely.

9 Claims, 6 Drawing Sheets

HEADREST

BACKGROUND OF THE INVENTION

1. Field of the Invention

The present invention relates to a headrest for use in an automotive seat, and particularly to an improvement in headrests of the type having a decorative board attached to its rear surface, which is designed for a two-seat cabin in the automobile without rear seat therein to make aesthetic the rear side of the seat, for instance.

2. Description of Prior Art

In the seat arrangement having no rear seat in an automobile, it is quite often the case that a hard decorative board made of a hard synthetic resin is attached to the rear surface of a headrest, because of no need to take care of rear-seat occupant and his or her safety conditions, to enhance an aesthetic appearance of the headrest per se.

A conventional example of this sort of headrest is shown in FIGS. 1 and 2, according to which a decorative board (1') of synthetic resin is adhesively attached to the rear side of a headrest body (H') such that both lateral walls as well as bottom wall of the headrest body (H') are covered by the decorative board (1').

The headrest body (H') comprises a foam cushion member (2') a covering member (4') which is affixed over the cushion member (2'), and an inverted-U-shaped frame (3') embedded in the cushion member (2') with a pair of stay sections of the frame (3') projecting downwardly from the bottom of the cushion member (2'). Between the two lateral frame sections of the frame (3'), a reinforcing rod (33) is extended to reinforce the frame (3'). Thus, in assembling the headrest body (H'), the frame (3') has been foamed together with the cushion (2') in a molding to provide an integral unit of foam cushion member having the frame (3'). The two stay sections (34)(34) form a pair of headrest stays of the headrest body (H') to be inserted into a mating pair of stay holes formed in the top of seat back (not shown).

In this prior-art structure, however, bonding the decorative board (1') by an adhesive to the rear side of the headrest body (H') requires some expertise to place the board (1') to a predetermined location in the headrest body (H') precisely for bonding thereto, and further the steps for bonding them together results a time-consuming task and gives unexpectedly troublesome work to a worker in spite of its simple bonding process.

SUMMARY OF THE INVENTION

In view of the above-stated drawbacks, it is a first purpose of the present invention to provide an improved headrest which permits easy attachment of a decorative board to the rear side thereof at a given position precisely.

To achieve the purpose, a headrest body in the present invention comprises a cushion member having a cut-away area in its rear side, in which cut-away area, a securing rod of a headrest frame embedded in the cushion member is exposed partly, and a decorative board having a gripping hook member formed integrally on its inner surface, wherein the gripping hook member is snap fitted over such exposed part of the securing rod within the cut-away area of the the cushion member, to thereby firmly attach the board to the headrest.

Thus, the decorative board can easily be attached at a given position at the rear side of the headrest body, by simply pressingly fitting the board thereto, and further locating of the board at that position can be effected precisely.

Preferably, a pair of securing notches may be formed at the lower side of the decorative board such as to be snap fitted on the respective stay sections of the headrest frame which projects downward from the the headrest body. This enhances firm attachment of the board to the headrest body.

It is a second purpose of the present invention to prevent the decorative board against wobbling or dislocation in the width-wise direction of the headrest body.

For such purpose, the securing rod is formed with a pair of spaced-apart detent portions to prevent the gripping hook member of the decorative board from moving laterally. The two detent portions are formed by collapsing flat the corresponding point in the securing rod such as to be compressed vertically on the opposite sides of the rod. The gripping hook member is closely sandwiched between thus-formed detent portions, and retained there against axial sliding movement along the securing rod.

It is a third purpose of the invention to enable the terminal end of a covering member of the headrest to be securely connected with the peripheral edges of the decorative board.

To this end, the peripheral edges of the decorattive board are formed with a hook-like part, whereas the terminal end of the covering member is provided with a hook-like retainer. Thus, by engaging together the hook-like part of the board and the hook-like retainer, the board is attached to the rear side of the headrest body, whereby there is established a firm connection between the covering member and decorative board, preventing the covering member from removal from the board.

DETAILED DESCRIPTION OF PREFERRED EMBODIMENTS OF THE INVENTION

FIGS. 3 through 6 illustrate a first embodiment of a headrest according to the present invention.

In this first embodiment, a headrest body designated by (H1) comprises a foam cushion member (2), a headrest frame (3) embedded in the cushion member (2), and a covering member (4) affixed adhesively over the cushion member (2), with a decorative board (1) attached to the rear side of the headrest (H1).

Figure 6:
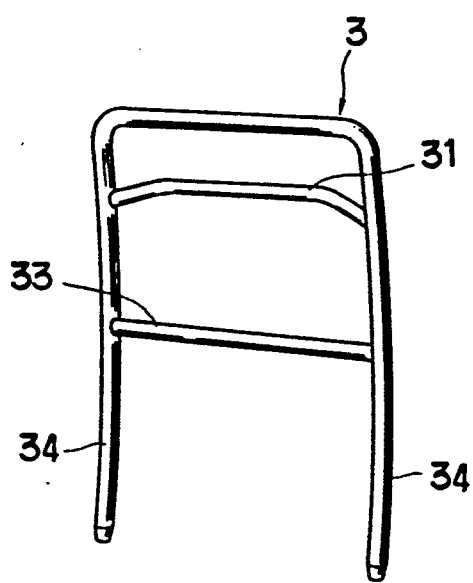
FIG. 6 is a perspective view of a headrest frame to be used in the first embodiment.

Referring to FIG. 6, the headrest frame (3) is shown as being basically constructed similarly to that of (3') of the previously described prior art, except that, between both lateral frame sections of the frame (3), there is provided a securing rod (31) as shown, which is formed by bending a metal pipe into a generally "U" shape. Its both ends are fixed to the lateral frame sections of frame (3), respectively, above the reinforcing rod (33).

The securing rod (31) projects in arcuate way in a direction rearwardly of the frame (3) for a purpose to be explained later.

Figure 5:
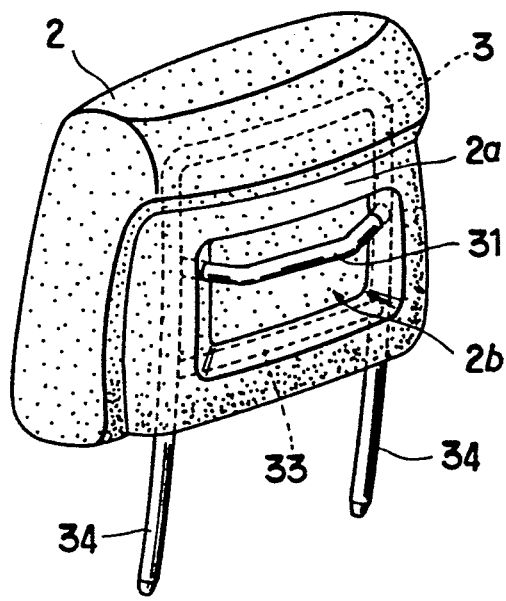
FIG. 5 is a perspective view showing the headrest of the first embodiment to be in the state prior to be covered with a covering member.

The cushion member (2) is formed at its rear side with a recessed area (2a) which spreads thereover from a part of left-side lateral wall of the cushion member (2) through the rear wall to a part of rightside lateral wall of the same, as viewd from FIG. 5. The recessed area (2a) is so dimensioned to conform to the outer contour of the decorative board (1), so that the board (1) is dimensioned to fit therein as will be described later. The rear side of the cushion member (2) is formed further with a cut-away area (2b) centrally within the recessed area (2a), which cut-away area (2b) is of such a depth that allows the securing rod (31) to be partly exposed therein, as will be set forth below.

In a practical mold foaming process to produce such an initial body unit as shown in FIG. 5, a base foamable material is injected into a proper mold in which the headrest frame (3) is placed, and then foaming is effected to form the cushion member (2) integrally with the frame (3), such that the cut-away area (2b) is defined, in which the securing rod (31) is part-way exposed as illustrated.

The covering member (4) is formed with a through-hole (4a) at its rear side to cover the rear wall of the cushion member (2). Such covering member (4) is bonded over the foregoing cushion member (2), using an adhesive, with care being taken to dispose the through-hole (4a) at a point corresponding to the exposed part of the securing member (31) in the cut-away area (2b) of the cushion member (2).

Figure 1:
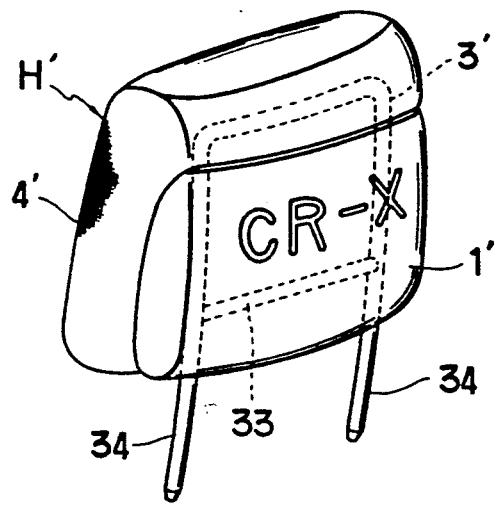
FIG. 1 is a perspective view of a conventional headrest, as viewed from its rear side.
Figure 2:
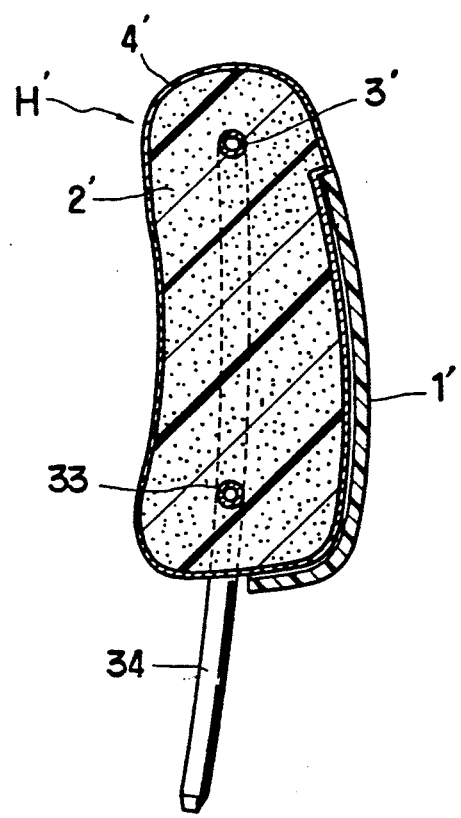
FIG. 2 is a longitudinally sectional view of such conventional headrest in FIG. 1.
Figure 3:
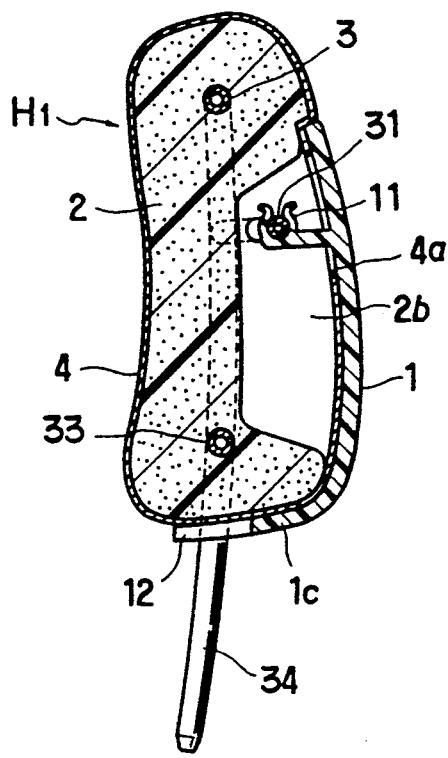
FIG. 3 is a longitudinally sectional view showing a first embodiment of a headrest in accordance with the present invention.
Figure 4:
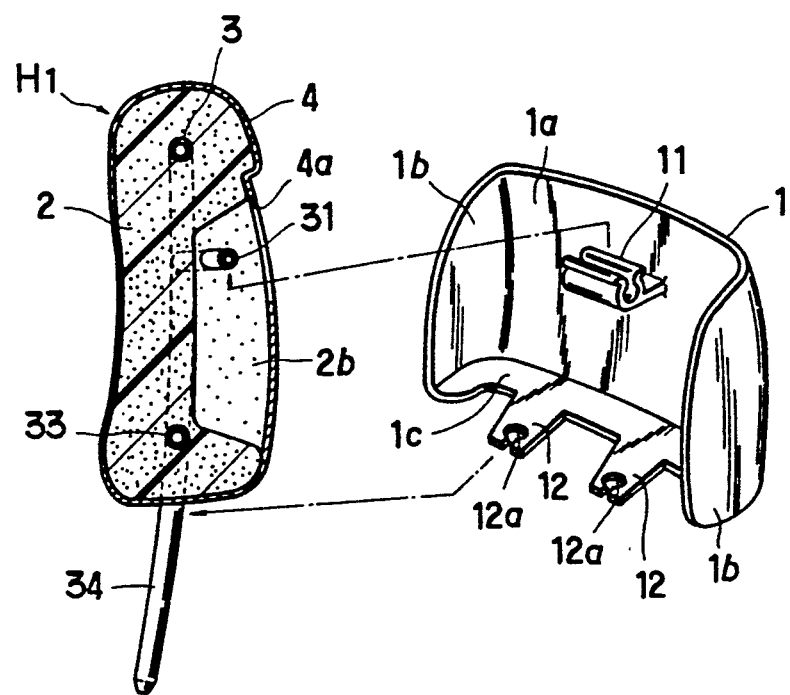
FIG. 4 is a partially exploded, longitudinally sectional view of the first embodiment as in FIG. 3.

The decorative board (1), as best shown in FIG. 4, is comprised of a rear wall (1a), a pair of lateral walls (1b)(1b) and a bottom wall (1c), thus forming a forwardly and upwardly opened, three-dimensional board on the whole. As similar to the board (1') of the prior art, such board (1) in the present invention is made of a hard synthetic resin material. On the inner surface of the rear wall (1a) of the board (1), there is integrally formed a gripping hook member (11) of a synthetic resin having an elastic property, with its securing opening directed upwardly. The location of the gripping hook member (11) on the rear wall (1a) is such as to correspond to the exposed part of securing rod (31) in the cut-away area (2b), so that, as will be explained later, the gripping hook member (11) receives the securing rod (31) firmly when attaching the board (1) to the headrest body (H1). In the bottom wall (1c) of the board (1), a pair of spaced-apart securing lugs (12)(12) are formed, projecting therefrom horizontally. Those two lugs (12)(12) are spaced a distance equal to a distance between the two stay sections (34)(34) of the headrest frame (3), and are each formed at its forward end with a securing notch (12a) to be fitted firmly over the respective stay sections (34)(34).

With the above-describe structure, attaching of the board (1) to the headrest (H1) is as follows: Firstly, the gripping hook member (11) is inserted through the through-hole (4a) of the covering member (4) and snap fitted over the exposed part of securing rod (31) in the cut-away (2b), after which, secondly, the two securing lugs (12)(12) are snap fitted on the respective stay sections (34)(34) of the headrest frame (3). In that way, the board (1) is attached securely to the rear side of headrest body (H1) at the predetermined position precisely.

Figure 7:
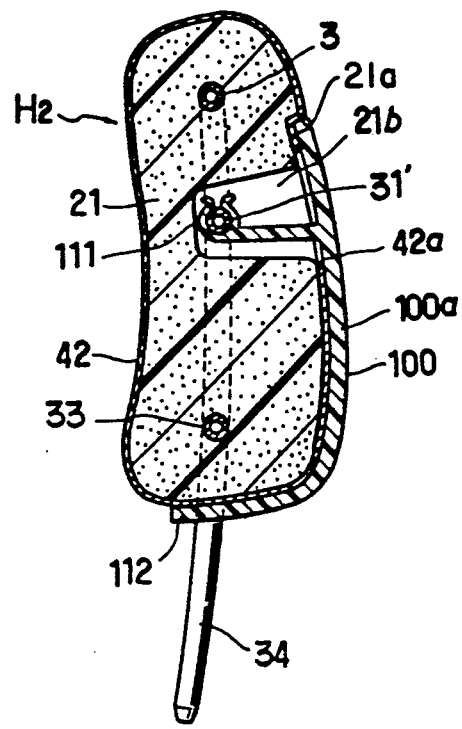
FIG. 7 is a longitudinally sectional view showing a second embodiment of headrest in accordance with the present invention.
Figure 8:
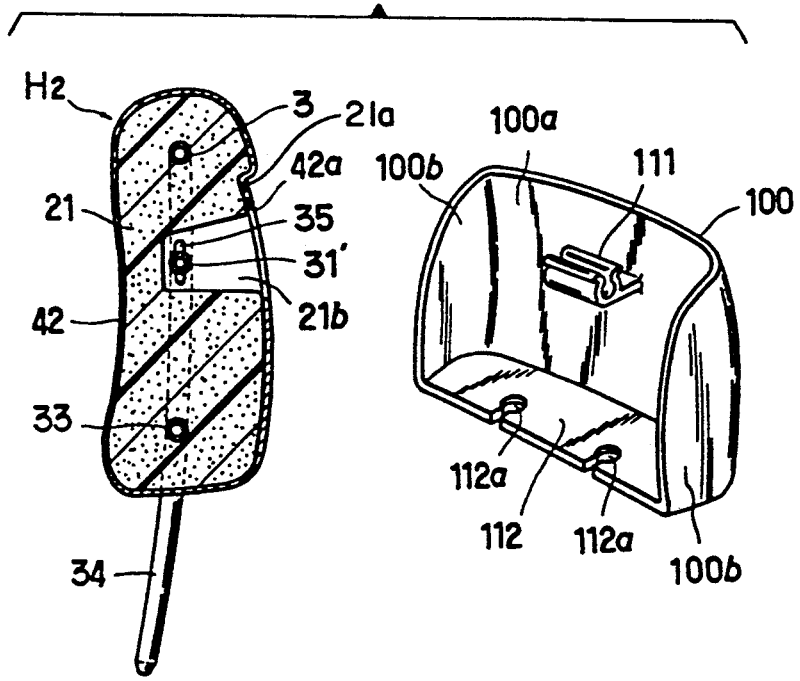
FIG. 8 is partially exploded, longitudinally sectional view of the second embodiment as in FIG. 7.
Figure 9:
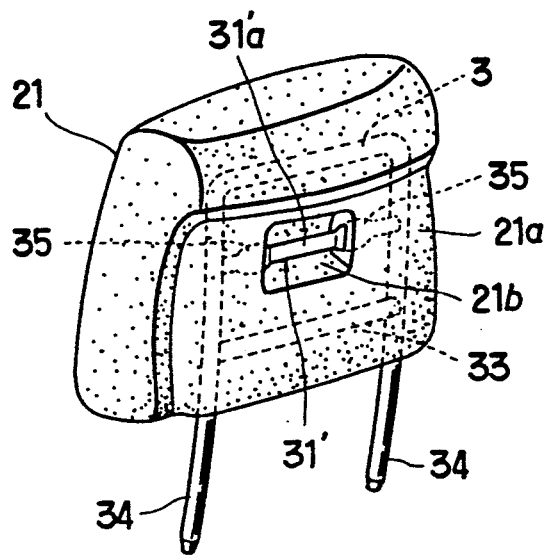
FIG. 9 is a perspective view showing the headrest of the second embodiment to be in the state prior to be covered with a covering member.

FIGS. 7 through 9 illustrate a second embodiment of the present invention, in which another mode of headrest body (H2) is shown as comprising a cushion member (21) whose formation is basically similar to that of the cushion member (2) of the first embodiment above, except that a deep cut-away area (21b) is formed therein, which is smaller in opening scale than that (2b) of the first embodiment, a headrest frame (3) which is also similar in construction to that (3') of the prior art, excepting the provision of a securing rod (31') which is formed with a pair of spaced-apart detent portions (35)(35), the headrest frame (3) being embedded in the cushion member (21) under the same mold foaming method referred to in the first embodiment above, and a covering member (42) affixed adhesively over the cushion member (21), the covering member (42) being generally similar to that (4) of the first embodiment.

With regard to the covering member (42), a through-hole (42a) formed therein is slightly different in opening scale or position from that (4a) stated in the first embodiment, because the former through-hole (42a) has to be formed in conformity with the small opening scale and position of the cut-away area (21b), as compared with the latter one (4a).

A decorative board (100) attached to the headrest body (H2), as similar to that (1) of the first embodiment, is of a forwardly and upwardly opened, three-dimensional type, comprising a rear wall (100a), a pair of lateral walls (100b)(100b) and a bottom wall (112), with a gripping hook member (111) and a pair of spaced-apart securing notches (112a)(112a) being resepctively formed at the rear wall (100a) and bottom wall (112) of the board (100).

Figure 10A:
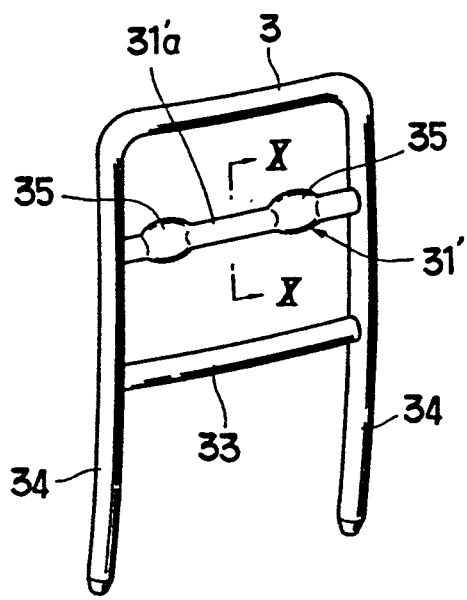
FIG. 10(A) is a perspective view of a headrest frame to be used in the second embodiment.
Figure 10B:
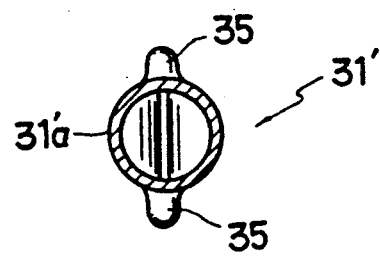
FIG. 10(B) is a sectional view taken along the line X—X.

Turning now to the securing rod (31'), particularly to the two detent portions (35)(35), FIGS. 10(A) and 10(B) give a specific view showing them to be flattened in the securing rod (31') with a securing region (31'a) defined therebetween. They are adapted to prevent the gripping hook member (11) against axial sliding movement along the securing rod (31'). The formation of those detent portions (35)(35) is by collapsing flat the corresponding predetermined points in the securing rod (31'), under a suitable press working process, such that the resulting flattened portions (35)(35) are compressed vertically on the opposite sides of and relative to the axis of the securing rod (31'), as best seen from FIG. 10(B). Care must be taken here that the securing region (31'a) between the two flattened detent portions (35)(35) is defined an amount substantially equal to the width of the gripping hook member (111), for the gripping hook member (111) is snap fitted on that securing region (31'a) and retained closely between the two detent portions (35)(35) against sliding movement along the longitudinal direction of securing rod (31'), as will become apparent later.

Referring to FIGS. 8 and 9, in the cushion member (21), at its rear side, the deep cut-away area (21b) formed therein is of a depth reaching the securing rod (31) embedded in the cushion member (21), as understandable from FIG. 8, and further of such an opening scale that allows partial exposure of the two detent portions (35)(35) and entire exposure of the securing region (31'a), as shown in FIG. 9.

Accordingly, attaching of the decorative board (100) to the headrest body (H2) is as follows: The gripping hook member (111) is passed through the through-hole (42a) of covering member (42) into the cut-away area (21b), and snap fitted about the securing region (31'a), after which, the two securing notches (112a)(112a) are snap fitted to the respective stay sections (34)(34) of headrest frame (3). Thus, the board (100) is attached firmly to the rear side of headrest body (H2), as illustrated in FIG. 7.

Figure 11:
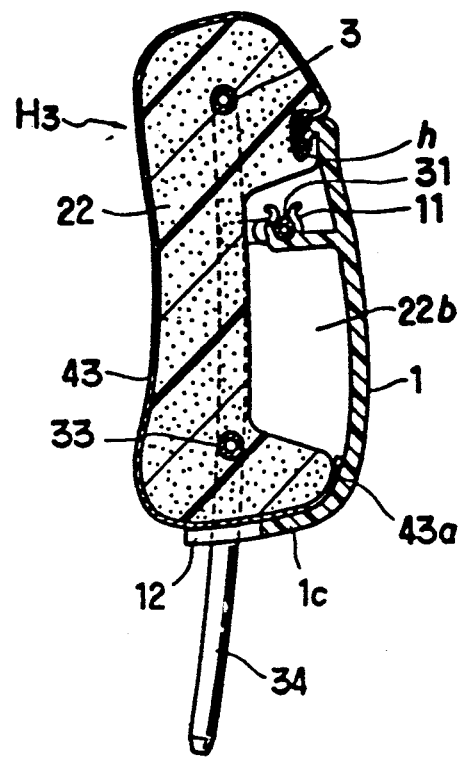
FIG. 11 is a longitudinally sectional view showing a third embodiment of headrest in the invention.
Figure 12:
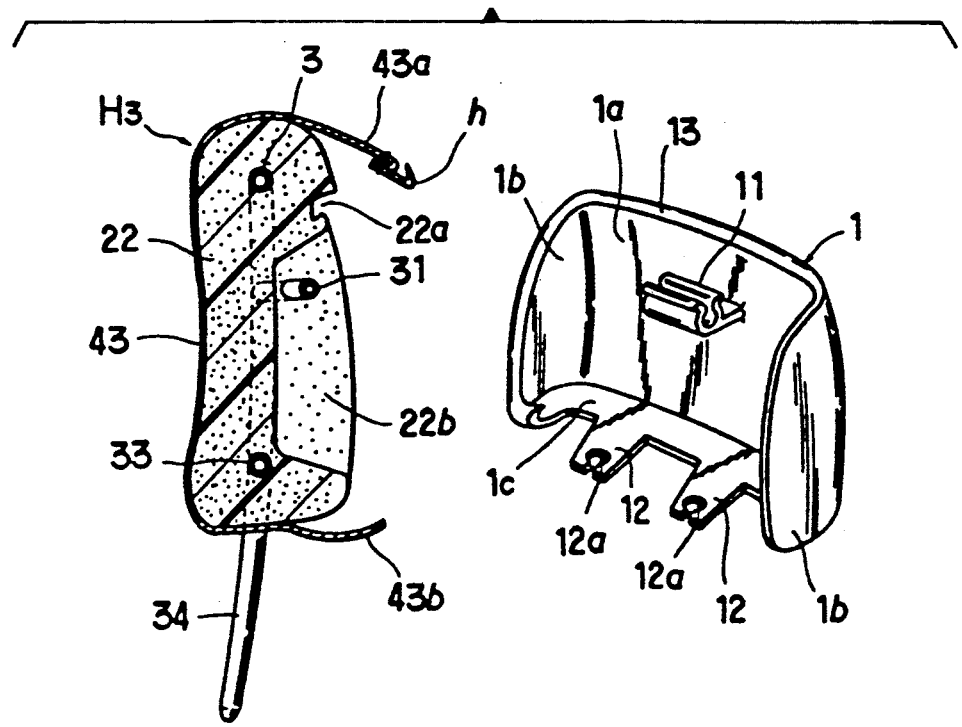
FIG. 12 is a partially exploded, longitudinally sectional view of the third embodiment as in FIG. 11.

FIGS. 11 and 12 shows a third embodiment of the present invention. In this third embodiment, a headrest body (H3) employs the same headrest frame (3) and decorative board (1) as described in the previous first embodiment, and specific description thereon is omitted, with like designations in the present embodiment corresponding to like ones in the first embodiment.

A cushion member (22) herein is formed with a cut-away area (22b), likewise as in the first embodiment, but a groove (22a) is formed along the contour of the recessed area (not shown, but similar to that (2a) of the first embodiment ), excepting its lower side, as can be seen from FIG. 12.

An improvement contemplated herein is for retaining the terminal edges of a covering member (43) to a cushion member (22), utilizing the decorative board (1).

Therefore, the covering member (43) is formed with rearward edges (43a) which extend over the rear side of the cushion member (22) and circumscribes the recessed area (22b) thereof. On the other hand, the decorative board (1) is formed with an inwardly curved hook-like rim (13) integrally at the periphery of the board (1), excepting its periphery part at the bottom wall (12).

An upwardly curved hook-like retainer (h) is fixed by sewing along the rearward edge (43a) of the covering member (43), excepting its lower side designated at (43b). Preferably, the retainer (h) is made of a synthetic resin material.

With such structure, before attaching the decorative board (1) to the headrest (H3), the retainer (h) is inserted in the groove (22a) of the cushion member (22), and then the board (1) is firmly attached to the headrest (H3) by snap fitting the gripping hook member (11) over the securing rod (31), also snap fitting the two securing notches (12a) (12a) to the respective two stay sections (34) of the headrest frame (3), and then engaging the hooklike rim (13) with the retainer (h).

Accordingly, the third embodiment insures to avoid removal of the covering member terminal edges (4) from the board (1).

From the above descriptions, it is appreciated that according to the present invention, the decorative board can easily be attached to the rear side of headrest body, while precisely locating the board at a predetermined position there, and that there is eliminated a wobbling of the board laterally of the headrest body.

It should be understood that the present invention is not limited to the embodiments shown, but may be modified properly with some replacements and additions, structurally, without departing from the scope and spirit of the appended claims.

What is claimed is:

1. A headrest, which includes a decorative board of a synthetic resin attached to a rear side thereof, comprising:
   a cushion member forming a body of said headrest, said cushion member having a frame embedded therein;
   a securing rod provided in said frame;
   said cushion member being formed at its rear side with a cut-away area which exposes a part of said securing rod;
   a hook means provided integrally on an inner surface of said decorative board, said hook means being disposed at a location corresponding to said securing rod,
   wherein said hook means is fixedly fitted over said securing rod, to thereby firmly attach said decorative board to said rear side of said headrest.

2. The headrest according to claim 1, wherein said hook means comprises a gripping hook made of a synthetic resin material, having an opening into which is fitted securely said exposed part of said securing rod from said cut-away area.

3. The headrest according to claim 1, wherein said securing rod is formed by bending a metal pipe into a generally U-shaped configuration, so that a projected curved part of said securing rod is exposed through said cut-away area, and wherein said hook means is fixedly fitted over said projected part of said securing rod within said cut-away area.

4. The headrest according to claim 1, wherein said securing rod is formed with a detent means for preventing axial sliding movement of said hook means along said securing rod.

5. The headrest according to claim 4, wherein said detent means comprises a pair of spaced-apart flattened detent portions which are formed by collapsing flat two corresponding parts of said securing rod, and wherein a distance between said two flattened detent portions is substantially the same with a width of said hook means.

6. The headrest according to claim 1, wherein said headrest further comprises a recessed area which spreads over said rear side of said cushion member in dimensions conforming to a shape of said decorative board, and wherein, in said recessed area, said decorative board is fitted in place.

7. The headrest according to claim 1, wherein said frame is formed in an inverted U-shaped configuration, having, at its lower part, a pair of stay sections extending downwardly from a bottom of said cushion member, and said decorative board is provided with a securing means to be securely engaged with said pair of said stay sections of said frame, whereby said decorative board is retained by said securing means to said rear side of said cushion member in addition to said hook means.

8. The headrest according to claim 7, wherein said securing means comprises a pair of spaced-apart securing notches formed at the lower part of said decorative board, in such a manner that said securing notches are located at points corresponding to said pair of stay sections of said frame.

9. The headrest according to claim 1, wherein said board is provided at its peripheral edges with an integral hook-like rim, wherein a covering member is affixed over said cushion member, said covering member being at its terminal end with a hook-like retainer, and wherein said hook-like rim of said board is securingly engaged with said hook-like retainer, whereby said covering member is firmly retained, with its said terminal end being positively prevented against removal from said board.

* * * * *